Figure 1:
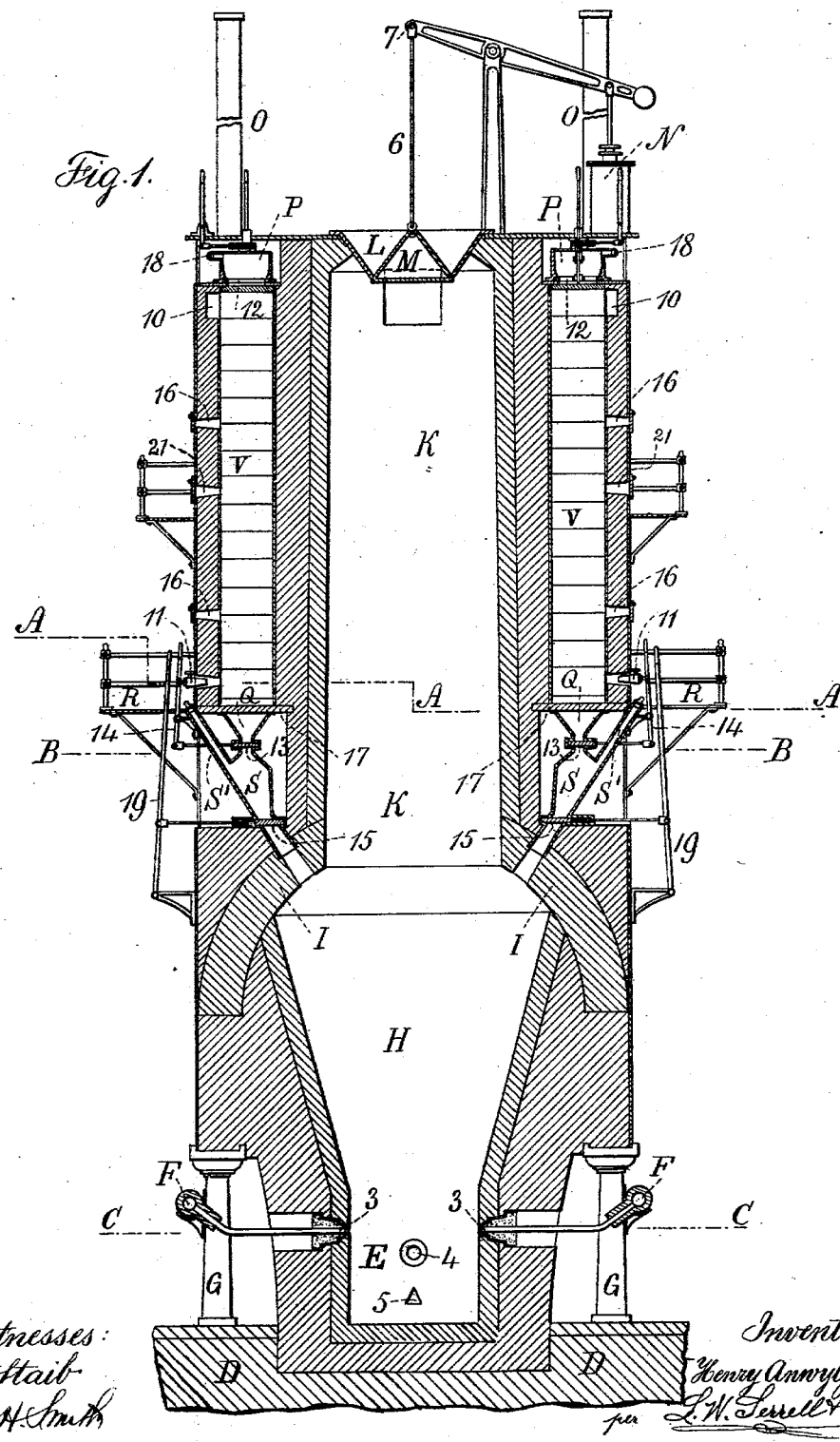

No. 715,235. Patented Dec. 9, 1902.
H. A. JONES.
FURNACE FOR SMELTING IRON.
(Application filed Apr. 24, 1899. Renewed Apr. 24, 1902.)

(No Model.) 2 Sheets—Sheet 1.

Witnesses:
J. Staib
Chas. H. Smith

Inventor:
Henry Anwyl Jones
per L. W. Serrell & Son
Attys.

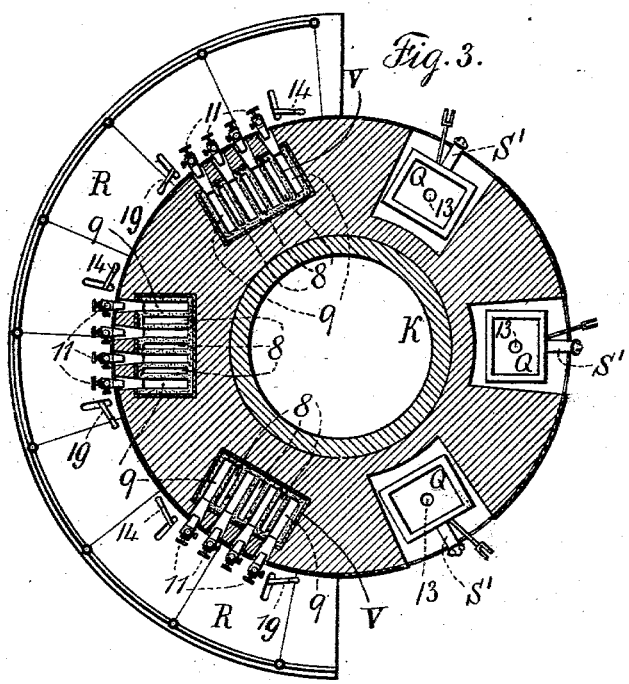
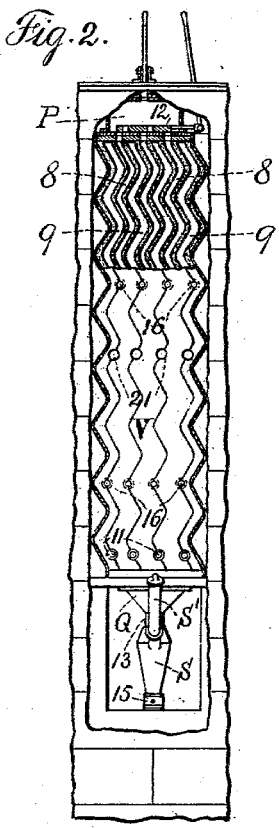
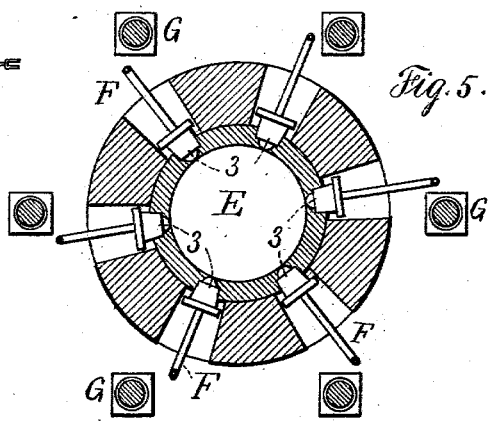

UNITED STATES PATENT OFFICE.

HENRY A. JONES, OF NEW YORK, N. Y., ASSIGNOR TO JONES DIRECT PROCESS STEEL COMPANY, OF JERSEY CITY, NEW JERSEY, A CORPORATION OF NEW JERSEY.

FURNACE FOR SMELTING IRON.

SPECIFICATION forming part of Letters Patent No. 715,269, dated December 9, 1902.

Application filed April 24, 1899. Renewed April 24, 1902. Serial No. 104,502. (No model.)

*To all whom it may concern:*

Be it known that I, HENRY ANWYL JONES, a citizen of the United States, residing in the city and State of New York, have invented an Improvement in Furnaces for Smelting Iron, of which the following is a specification.

In Letters Patent No. 566,186, granted to me August 18, 1896, a deoxidizing-furnace is represented in which the granular oxid of iron is supplied at the upper ends of zigzag retorts that are heated by the action of gas in flues between the deoxidizing-retorts, and in such Letters Patent the deoxidized material is supplied to melted iron upon the hearth of the reverberatory furnace. In the present improvement I arrange the deoxidizing-retorts around a blast-furnace and construct the parts with reference to passing the deoxidized and granular iron into the blast-furnace below the zone of carbonization and into the zone of fusion, so that the deoxidized iron melts and drops into the cinder-bath and passes through the same to the fused metal below.

In the ordinary blast-furnace the ores are finally reduced in the zone of fine carbon on top of the zone of fusion. At this place they become saturated with carbon, and the iron melts and passes through the zone of fuel and then the shots of melted iron pass through the bath of cinder, in which it is purified sufficiently and passes into the crucible portion of the furnace. In the present improvement by the use of raw ore and working the blast-furnace in the usual way the deoxidized ore introduced below the zone of carbonization of the raw ore immediately melts and passes along with the ordinary cast-iron, so that the proper proportion of carbon can be regulated, and an excess of the deoxidized ore can be made use of in connection with a smaller quantity of iron from the raw ore, and the resulting product is an iron of great tensile strength and by a comparatively small expenditure of fuel.

In the drawings, Figure 1 is a vertical section of a blast-furnace with the present improvements added thereto. Fig. 2 is an elevation, partially in section, representing the deoxidizing-retorts. Fig. 3 is a sectional plan view at the line A A, Fig. 1. Fig. 4 is a sectional plan view at the line B B, Fig. 1; and Fig. 5 is a sectional plan view at the line C C, Fig. 1.

The blast-furnace rests upon a suitable base D, and the crucible portion E is surrounded with fire-brick and brickwork, as usual. The blast is supplied at the air-pipes F and twyers 3. The melted cinder is drawn off at the opening 4, and at 5 is the iron tapping-hole. The columns at G support the upper part of the blast-furnace, and above the crucible portion E the chamber is flaring, as at H, and there is a fire-brick arch 1 supporting the cylindrical chamber K, at the top of which is the conical supply-hopper L and the bell M, having a connecting-rod 6, pivoted at 7 and provided with a hydraulic lift N, by which the bell is actuated.

The blast-furnace portion of this apparatus is actuated in substantially the ordinary manner, the ore and fuel being supplied by lowering the bell M, and in operation the heat and fuel present act to carbonize the iron in the lower portion of the cylindrical chamber K, and below this and in the upper portion of the flaring chamber H is the zone of fusion, from which the iron in a melted condition trickles down into the crucible portion E, there being a layer of cinder and slag above the iron, which is drawn out through the opening 4.

In the cylindrical wall around the chamber K of the blast-furnace I form a number of vertical chambers, in which I place a series of deoxidizing-retorts V, and these deoxidizing-retorts are each made with vertically-arranged zigzag chambers 8, into which the pulverulent oxid of iron is introduced at the top, and between these zigzag ore-chambers are zigzig gas-heating chambers 9, and these latter open at the top into the flues 10, that lead to any suitable outlets or chimneys O. These zigzag chambers are similar to those shown in my Patent No. 566,186. Gas and air are supplied to burners 11 in regulated quantities, so that the burners become Bunsen burners and the flames pass up through the zigzag heating-chambers 9. The gas made use of in these burners can be obtained in any desired manner—such, for instance, as by conveying away the carbonic oxid and carbonic acid that result from the deoxidizing of the iron ore in the zigzag chambers in the presence of the carbon with which such granular ore is mixed. The supply of the ore and carbon is at the upper end of the zigzag chambers 8, there being a hopper at P for each set of retorts and a valve 12 for regulating the discharge of the ore or carbon from the hopper into the upper ends of the zigzag chambers 8, and at the lower ends of the zigzag chambers such chambers open into a hopper Q, having a slide-valve 13, actuated by a lever 14, and there is a gallery around the blast-furnace and retorts, as illustrated, for the attendant, so that he can actuate the levers 14 and slide-valves at the proper intervals to allow the deoxidized granular iron to pass down into the supply-hoppers S, there being a hopper Q and supply-hopper S to each set of deoxidizing-retorts, and at the bottom of each supply-hopper S is a valve 15, actuated by a lever 19 from the gallery R to allow the deoxidized iron to pass into the blast-furnace directly into the zone of fusion, so that such material is immediately melted and combines along with the melted iron of the blast-furnace and falls through the zone of fusion and through the layer of cinder into the crucible portion E of the furnace. Under ordinary circumstances the granular deoxidized ore will pass down through the zigzag chambers in the retorts and such zigzag chambers will be substantially full, and when the valve 13 of a retort is opened the material will pass from the hopper Q into the hopper S and substantially fill such hopper S. The valve 13 is then to be closed and material admitted from the hopper P by withdrawing the valve 12, so as to fill in at the upper ends of the zigzag chambers 8 in order that the deoxidizing operation may continue progressively, and at the proper time the valve 15 is withdrawn, so that the deoxidized material in its highly-heated condition, together with any remaining carbon, may pass directly into the chamber H and into the zone of fusion, so as to be fused with the molten iron of the blast-furnace and pass down into the crucible portion of such furnace, and in this manner the quality of iron produced can be easily regulated by varying the proportion of granular deoxidized iron to the cast-iron, so that a product can be obtained having the desired proportion of carbon.

Extending up from each supply-hopper S is a tube S' coming up to the level of the gallery, or nearly so, and there is a removable stopper at the upper end of each tube, so that by lifting out this stopper a bar can be inserted to agitate the deoxidized iron in the hopper S to cause the same to pass down from the hopper into the zone of fusion of the blast-furnace.

At 16 sight-holes are represented that are advantageously provided for observing the condition of the gas-flame made use of in heating the retorts.

In the operation of deoxidizing the granular ore the combination between the oxygen and the carbon results in the development of carbonic-oxid gas, and such gas can be utilized by conveying the same away by the gas-pipe 18 to any suitable gas-holder, so that such gas can be returned to the Bunsen burners or mixed with other gas before being so returned to the Bunsen burners.

It is generally advantageous to construct the walls around the blast-furnace with rectangular recesses, into which are inserted and built in the deoxidizing-retorts, such retorts resting upon the bottom plates 17, that are built into the mason-work of the blast-furnace and are provided with slots or openings through which the granular deoxidized ore passes from the deoxidizing-chambers into the hoppers Q, as before mentioned. I have shown Bunsen burners applied at 11 to the retorts, and a second range of openings is represented at 21 for the reception of other burners, if required.

I claim as my invention—

1. The combination with the blast-furnace having a crucible for molten metal, a flaring fusion-chamber above the crucible, a cylindrical chamber above the fusion-chamber and of smaller diameter than the upper part of the said fusion-chamber, and a series of equally-spaced vertical recesses in the furnace-wall, of zigzag deoxidizing ore-retorts in said recesses and heating-flues between said retorts, burners for supplying gas and air thereto within said recesses, means for covering said retorts, receiving-hoppers beneath the deoxidizing-retorts and devices connecting the receiving-hoppers with the upper part of the fusion-chamber for delivering the deoxidized ore to the furnace, substantially as shown.

2. The combination with the blast-furnace having a crucible for molten metal, a flaring fusion-chamber above the crucible, a cylindrical chamber above the fusion-chamber and of smaller diameter than the upper part of the said fusion-chamber and a series of equally-spaced vertical recesses in the furnace-wall, of zigzag deoxidizing ore-retorts in said recesses and heating-flues between said retorts, burners for supplying gas and air thereto within said recesses, means for covering said retorts, receiving-hoppers containing the granular ore beneath the deoxidizing-chambers, supply-hoppers receiving such granular ore, valves between the receiving-hoppers and the supply-hoppers to regulate the discharge of the granular ore from the former to the latter, passages from the supply-hoppers to the upper part of the fusion-chamber and valves in said passages to regulate the discharge of the deoxidized ore to the molten metal, substantially as set forth.

3. The combination with the blast-furnace having a crucible for molten metal, a flaring fusion-chamber above the crucible, a cylindrical chamber above the fusion-chamber and of smaller diameter than the upper part of the said fusion-chamber and a series of equally-spaced vertical recesses in the furnace-wall, of a series of deoxidizing ore-retorts in said recesses, means for covering the same, receiving-hoppers containing the deoxidized ore beneath said retorts, supply-hoppers connected to the receiving-hoppers, valves between said receiving and supply hoppers, tubes extending upward from the supply-hoppers through which devices may be inserted to insure the proper discharge of the deoxidized ore from the supply-hoppers, passages from the supply-hoppers to the upper part of the fusion-chamber, valves in said passages, platforms around the furnace and means for operating the aforesaid valves therefrom, and means for visually observing the interior of the deoxidizing-retorts, substantially as set forth.

Signed by me this 17th day of April, 1899.

HENRY A. JONES.

Witnesses:
 GEO. T. PINCKNEY,
 S. T. HAVILAND.